(12) United States Patent
Wilder et al.

(10) Patent No.: US 8,790,512 B2
(45) Date of Patent: Jul. 29, 2014

(54) FLUID FILTER MONITORING DEVICE

(75) Inventors: Haim Wilder, Raanana (IL); Abraham J. Domb, Efrat (IL)

(73) Assignee: Strauss Water Ltd., Petach Tikva (IL)

( * ) Notice: Subject to any disclaimer, the term of this patent is extended or adjusted under 35 U.S.C. 154(b) by 424 days.

(21) Appl. No.: 12/444,635

(22) PCT Filed: Aug. 28, 2007

(86) PCT No.: PCT/IL2007/001065
§ 371 (c)(1),
(2), (4) Date: May 21, 2009

(87) PCT Pub. No.: WO2008/044230
PCT Pub. Date: Apr. 17, 2008

(65) Prior Publication Data
US 2010/0084347 A1 Apr. 8, 2010

Related U.S. Application Data

(60) Provisional application No. 60/828,643, filed on Oct. 8, 2006, provisional application No. 60/872,489, filed on Dec. 4, 2006.

(51) Int. Cl.
*B01D 35/143* (2006.01)
*B01D 46/00* (2006.01)
*C02F 1/00* (2006.01)

(52) U.S. Cl.
CPC ............ *B01D 46/0086* (2013.01); *C02F 1/003* (2013.01)
USPC ................... 210/95; 210/85; 210/86; 210/91; 210/232; 210/435; 210/745

(58) Field of Classification Search
CPC ............................ C02F 1/003; B01D 46/0086
USPC ......... 210/717, 739, 745, 85, 86, 91, 95, 263, 210/321.6, 348, 350, 352, 232, 435; 422/400, 401, 534
See application file for complete search history.

(56) References Cited

U.S. PATENT DOCUMENTS 2,413,375 A 12/1946 Pomroy
3,520,124 A 7/1970 Myers
(Continued)

FOREIGN PATENT DOCUMENTS

EP 0202201 A2 11/1986
EP 0469407 A2 2/1992
(Continued)

OTHER PUBLICATIONS

International Search Report—(PCT/IL2007/001065); 3 pages; Nov. 11, 2007.
(Continued)

*Primary Examiner* — John Kim
(74) *Attorney, Agent, or Firm* — Greenberg Traurig, LLP

(57) ABSTRACT

An indicator for the status of the filter is provided. The indicator comprises at least one erodable member in contact with the source fluid and a visual indication arrangement that permits a viewer to gauge the appearance of the erodable member to thereby gauge the filter status. The erodable member is eroded by interaction with the fluid or with an element within the fluid. The indicator may be incorporated as an integral component of a filter or may be a stand-alone device to be incorporated into a filter or filtration system.

16 Claims, 7 Drawing Sheets

(56) References Cited

U.S. PATENT DOCUMENTS

| | | |
|---|---|---|
| 3,937,399 A | 2/1976 | Halley |
| 4,028,876 A | 6/1977 | Delatorre |
| 4,702,270 A | 10/1987 | King, Sr. |
| 4,772,386 A | 9/1988 | Grout et al. |
| 4,818,385 A * | 4/1989 | Medley, III ............ 210/90 |
| 5,076,912 A | 12/1991 | Belz et al. |
| 5,236,578 A | 8/1993 | Oleskow et al. |
| 5,527,451 A | 6/1996 | Hembree et al. |
| 5,536,394 A | 7/1996 | Lund et al. |
| 5,667,303 A | 9/1997 | Arens et al. |
| 5,679,243 A | 10/1997 | Cho |
| 5,882,507 A | 3/1999 | Tanner et al. |
| 6,926,828 B2 | 8/2005 | Shiraishi et al. |
| 7,441,665 B2 | 10/2008 | Bridges et al. |
| 2004/0094459 A1 | 5/2004 | Prater et al. |
| 2005/0109683 A1 | 5/2005 | Joyce et al. |

FOREIGN PATENT DOCUMENTS

| | | |
|---|---|---|
| WO | 9613318 A1 | 5/1996 |
| WO | 9941201 A1 | 8/1999 |
| WO | 0200552 A2 | 1/2002 |

OTHER PUBLICATIONS

International Preliminary Report on Patentability; (PCT/IL2007/001065); 6 pages; Apr. 15, 2009.

PCT Written Opinion of the International Searching Authority; (PCT/IL2007/001065); 5 pages; 2005.

* cited by examiner

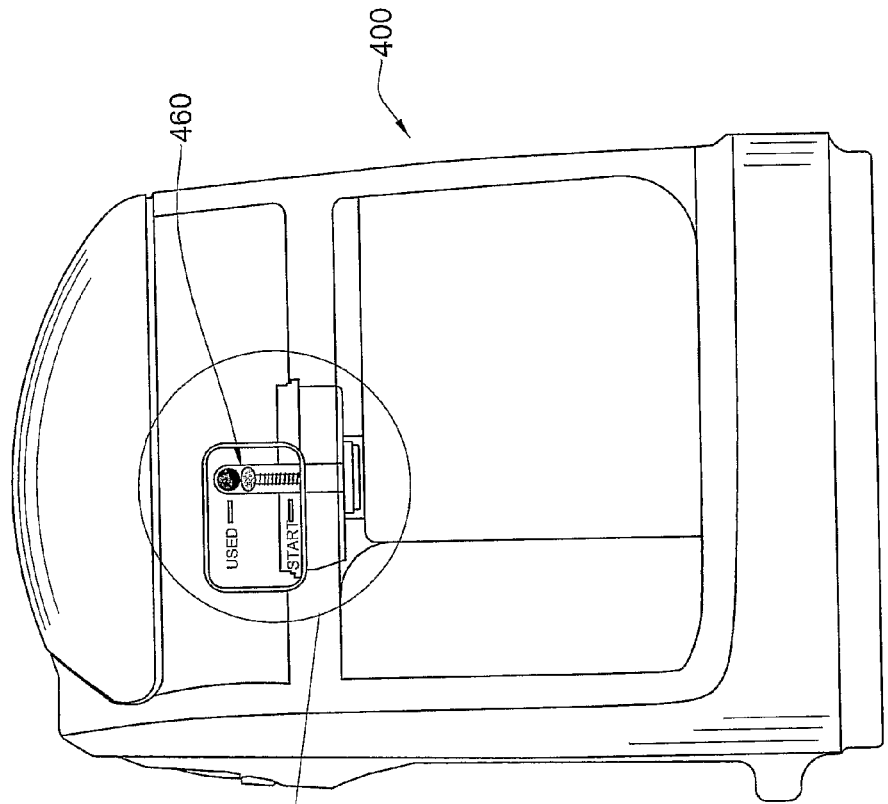
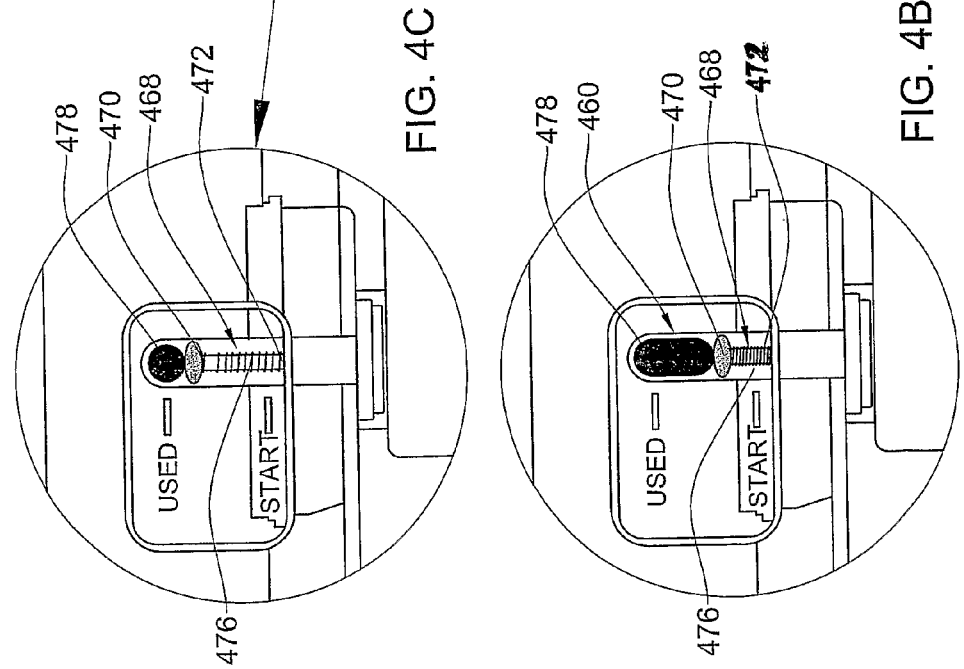

FLUID FILTER MONITORING DEVICE

CROSS-REFERENCE TO RELATED APPLICATIONS

This application claims the benefit of U.S. provisional application Ser. Nos. 60/828,643 filed Oct. 8, 2006 and 60/872,489 filed Dec. 4, 2006.

FIELD OF THE INVENTION

The invention relates to an indicator for monitoring a fluid filter status, namely the extent in which the filter was used, when it should be replaced, etc. The invention also relates to a filter and filtering systems comprising such an indicator as well as methods that make use thereof.

BACKGROUND OF THE INVENTION

Fluid filters have limited useful lifetime after which the filter medium becomes saturated with filtered out impurities or contaminants and ceases to be effective in their removal from the fluid. Means for indicating when a filter reaches the end of its useful life are important for many applications. A variety of indicator means for that purpose are available.

Most of the electronic and the mechanical indicator systems employ volume related mechanisms, i.e. totalize the fluid volume which is passed through the filter treatment media. Such indicator systems are exemplified by U.S. Pat. Nos. 5,236,578 and 5,679,243 (electronic indicator systems) and by U.S. Pat. Nos. 5,527,451; 5,536,394 and 5,882,507 (mechanical indicator systems). An alternative approach for measuring the actual utilization of the active components in the filter is disclosed in U.S. Pat. No. 5,716,912 which describes the use of a color indicator bonded to an ion exchange resin within the filter cartridge, where said indicator changes color when the ion exchange capacity of the filter becomes exhausted.

An alternative approach for determining the end of useful life of the filter takes into account the time elapsed since the activation of the filter. This approach is utilized by many of the chemical and diffusion indicator systems. Examples of such indicators include: U.S. Pat. No. 3,520,124 in which two reagent-bearing porous matrices are brought into contact, resulting in a time-dependent color changing reaction; U.S. Pat. No. 4,028,876 in which two reagents slowly mix through a porous medium to produce a color change; U.S. Pat. No. 5,667,303 in which a viscoelastic material slowly migrates into a porous medium in order to provide a visually observable indication; WO 0200552 in which water migrates into a color change mechanism and causes first and second reagents to react producing a color change.

SUMMARY OF THE INVENTION

The present invention concerns means for monitoring filter status. Said means comprises an indicator that provides an indication as to the filter status, and particularly when a filter reaches the end of its useful life.

The term "filter status" as used herein denotes the usefulness of the filter in filtering the fluid to be filtered. It may be a qualitative measure or at times a quantitative measure. The filter status is typically a reflection of the extent of past filtering use of the filter and hence its efficiency in continued use in filtering the fluid. The question of whether a filter is still effective for filtering the fluid depends on a current physical or chemical attributes of the filtering medium, for example the level of saturation of the filtering medium by pollutants or noxious substances to be removed from the fluid thereby. Determination of the filter status may also be contingent on acceptable or regulated standards. For example, a standard may define that a filter with a certain degree, e.g. 10, 20, 30, 40 or at times 50%, of remaining filtering capacity should be classified as being exhausted and thus the filter or the filtering device as being in need of replacement.

The indicator of the invention provides an indication of the filter status. As will be appreciated from the description below, the indicator does not measure the filter status directly. Rather, the present invention makes use of an indicator that comprises at least one erodable member that is erodable by the fluid or by an element within the fluid, whereby the extent of exposure to the fluid correlates with the extent of erosion of said member. The indicator is positioned such that the at least one erodable member comes into contact with the fluid whereby the fluid can interact with the at least one erodable member to cause its erosion. Thus, the degree of erosion can then serve as an indicator for the filter status and hence its usefulness in further filtering of the fluid. The erodable member is chemically and physically designed to have an erosion profile such that its erosion will substantially reflect the change in the filter status from fresh or useable to used or exhausted. The indicator may be designed to provide a quantitative measure of filter status, e.g. in percent, or a qualitative measure, for example with an indication, when the filter reached its end of effective life and should be replaced or replenished.

In the following description the term "source fluid" will be used to denote the fluid that is filtered by the filter. The term "filtered fluid" will be used to denote the fluid that was filtered through the filter.

The filter may be intended for a variety of purposes including a variety of gases and liquids. A specific example of the invention is filtration of water, particularly filtering water to yield filtered, potable water (the latter to be referred to at times as the "potable water embodiment"). In the potable water embodiment, the filter may be a filter incorporated in a portable water filtration device or in a tap-water filtration system intended, for example, to yield potable water, e.g. of the kind to be exemplified below.

By a first aspect, the present invention provides a fluid filter incorporating an indicator of the invention.

In accordance with one embodiment, there is provided a fluid filter for filtering a source fluid, comprising: an indicator for the status of the filter that comprises at least one erodable member in contact with the source fluid and a visual indication arrangement that permits a viewer to gauge the appearance of the erodable member to thereby gauge the filter status; said at least one erodable member being eroded by interaction with the source fluid or with an element within the fluid, whereby the extent of erosion indicates the filter status.

The term "appearance" should be understood to encompass any outward or visible aspect related to physical form or look. It includes, for example, size, shape, form, color, etc.

In accordance with another embodiment, there is provided a fluid filter for filtering a source fluid comprising: an indicator for the status of the filter that comprises an indicator member and at least one erodable member; the indicator member is displaceable from an initial state to an end state and is biased for displacement to the end state; the at least one erodable member is erodable through interaction with the source fluid or with an element within the fluid, the at least one erodable member blocks the biased displacement of the indicator member; whereby erosion of the at least one erodable member causes displacement of the indicator member from the initial state towards the end state, said displacement being an indicator of the filter status.

The term "displacement" should be understood to encompass a change in position or change in state. It includes, for example, a change in angular orientation of the displaceable member, movement between one position to another in a linear or non-linear track, etc.

By another of its aspects the present invention provides an indicator device for use in conjunction with a fluid filtration system.

By one embodiment there is provided an indicator device for use in combination with a fluid filtration system for filtering source fluid, the device comprises at least one erodable member in contact with the source fluid and a visual indication arrangement that permits a viewer to gauge the appearance of the at least one erodable member to thereby gauge the filter status; said at least one erodable member being eroded by interaction with the source fluid or with an element within the fluid, whereby the extent of erosion indicates the filter status.

By another embodiment there is provided an indicator device for use in combination with a source fluid filtration system, comprising an indicator member and at least one erodable member; the indicator member is displaceable from an initial state to an end state and is biased for displacement to the end state; the at least one erodable member is erodable through interaction with the source fluid or with an element within the fluid, the at least one erodable member blocks the biased displacement of the indicator member; whereby erosion of the at least one erodable member causes displacement of the indicator member from the initial state towards the end state, said displacement being an indicator of the status of the filter.

Also provided by yet another aspect of the invention is a fluid filtration system comprising a fluid filter and an indicator according to the invention.

In accordance with one embodiment, there is provided a fluid filtration system for filtering a source fluid, comprising: (i) a fluid filter for filtering the source water; and (ii) an indicator for the status of the filter that comprises at least one erodable member in contact with the source fluid and a visual indication arrangement that permits a viewer to gauge the appearance of the erodable member to thereby gauge the filter status; said at least one erodable member being eroded by interaction with the source fluid or with an element within the fluid, whereby the extent of erosion indicates the filter status.

In accordance with another embodiment, there is provided a fluid filtration system for filtering a source fluid, comprising: (i) a fluid filter for filtering the source water; and (ii) an indicator for the status of the filter that comprises an indicator member and at least one erodable member; the indicator member is displaceable from an initial state to an end state and is biased for displacement to the end state; the at least one erodable member is erodable through interaction with the source fluid or with an element within the fluid, the at least one erodable member blocks the biased displacement of the indicator member; whereby erosion of the at least one erodable member causes displacement of the indicator member from the initial state towards the end state, said displacement being an indicator of the filter status.

In the filtration system of the invention the indicator may be a unit separate from the filter. In other embodiments the filter and the indicator may be combined into one unit, either a priori provided as one unit or assembled together before insertion into the filtration system.

Also provided, by another aspect of the invention, is a method for monitoring the filter status, for example to determine the end of the filter's useful life.

In accordance with one embodiment there is provided a method for monitoring status of a fluid filter, comprising: providing an indicator for the status of the filter that comprises at least one erodable member in contact with the source fluid and a visual indication arrangement that permits a viewer to gauge the appearance of the at least one erodable member to thereby gauge the filter status; said member being eroded by interaction with the fluid or with an element within the fluid; and determining the extent of erosion, being an indicator for the filter status.

In accordance with another embodiment, the invention provides a method for monitoring extent of use of a filter, comprising: providing an indicator device having an indicator member and at least one erodable member; the indicator member is displaceable from an initial state to an end state and is biased for displacement to the end state; the at least one erodable member is erodable through interaction with the source fluid or with an element within the fluid, the at least one erodable member blocks the biased displacement of the indicator member; whereby erosion of the erodable member causes displacement of the indicator member from the initial state towards the end state; and monitoring state of the indicator member, displacement of the indicator member providing an indication of the filter status.

Also provided by an additional aspect is a fluid filtration system that comprises an indicator of the invention or which makes use of the method of the invention.

BRIEF DESCRIPTION OF THE DRAWINGS

In order to understand the invention and to see how it may be carried out in practice, a preferred embodiment will be described below, by way of non-limiting example only, with reference to the accompanying drawings, in which:

FIG. 4A shows a water filtration system including an indicator according to an embodiment of the invention.

FIG. 4B and FIG. 4C are enlarged views of the indicator of the system of FIG. 4A in an initial state and in a state after extensive use of the filter, respectively.

DETAILED DESCRIPTION OF EXEMPLARY EMBODIMENTS

Figure 1A:
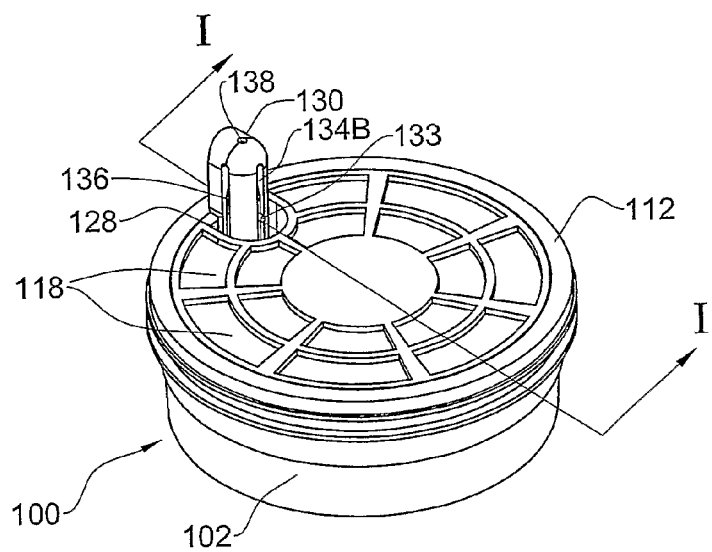
FIG. 1A shows a perspective view of a filter device incorporating an indicator according to an embodiment of the invention.

The present invention provides a novel indicator for indication of the extent of use of a fluid filter with which the indicator is associated.

As will be appreciated, the invention is not limited for use with a filter for any specific fluid and can be used in combination with filters for filtering a wide variety of fluids including gases and liquids. In a preferred, albeit a non-exclusive, embodiment of the invention, the filtered fluid is water. A particularly preferred embodiment of the invention is use in conjunction with filters for filtering source water to obtain potable water. The term "potable water" denotes water of a quality suitable and safe for human consumption, such as drinking and cooking, with minimal risk to an individual's health. There are minimum quality public-health standards for potable water in various countries throughout the world, and the term "potable water" preferably means water of a quality that meets such standards.

The indicator in accordance with the invention comprises at least one, e.g. one, two, three, four or more, erodable member and, as already noted above, the extent of erosion serves as an indication for the extent of use of the filter, and hence, the quality of the filter in terms of its ability to efficiently filter the fluid. In particular, the indicator serves to indicate when a filter should be replaced with a fresh one.

In accordance with one embodiment of the invention, the indicator comprises at least one erodable member contained in a housing which is either transparent or translucent or at least contains a transparent or a translucent window that permits to view the at least one erodable member and to determine when it was eroded to an extent such that the filter should be replaced or that the filtration medium should be replenished.

Erodable materials useful as constituents of the erodable member according to the invention include materials that slowly dissolve into the filtered media without being degraded, materials that degrade into soluble fragments or materials that gradually disintegrate into small insoluble particles or fragments.

The at least one erodable member may be eroded, according to one embodiment of the invention, through interaction directly with the fluid. Where the fluid is water, examples of erodable material may include a variety of polymeric or non-polymeric materials. Examples of erodable non-degradable materials useful as constituents of the erodable member include materials that are either entrapped by the filter before reaching the purified water or are safe for human consumption and do not add unwanted taste or odor. Examples of safe materials for use in the potable water embodiment are erodable or degradable materials meeting GRAS (generally regarded as safe) criteria, e.g. of the kind routinely used in oral dosage from of pharmaceuticals.

Erodable non-degradable materials useful in particular in the potable water embodiment, include mono and oligosaccharides, e.g. sucrose, mannitol, xylitol, fructose, alginates, guar gum, chitosan, arabinogalactane and mixtures thereof, amino acids and their derivatives, fatty acids and fatty alcohols, organic salts, poly(ethylene glycol) (PEG) and poly (propylene glycol) (PPG) of different molecular weights and structures, as well as their block and random copolymers. Also useful are erodable members comprised of mixtures or copolymers of PEG with hydrophobic groups such as fatty acids, poly(lactic acid) or propylene glycol or with hydrophilic groups such as sugar molecules and amino acids. Other slowly-dissolving compositions useful as constituents of the erodable member include water soluble or dispersible acrylic and methacrylic polymers such as copolymers of methacrylic acid and methyl methacrylate, such as EUDRAGIT® polymers, that are extensively used to coat solid drugs in oral dosage forms such as tablets, capsules or granules. Another class of polymers useful as constituents of the erodable member is cellulose derivatives, such as hydroxyethyl and hydroxypropyl cellulose, cellulose acetate phthalate and crystalline cellulose. Other soluble polymers useful as constituents of the erodable member include biodegradable polymers that degrade into shorter chains or even monomers, such as poly ($\alpha$-hydroxy acids), polyesters of lactic acid and glycolic acid, polyanhydrides based on aliphatic diacids, polycaprolactone and other biodegradable polymers well known for use in pharmaceutical formulations, as drug carriers and implants.

Where the filtered source fluid is of a non-aqueous nature, such as organic solvent, e.g. hexane, the selection of the erodable material should be tailored to the specific fluid and to the specific system conditions, such as temperature, pressure and presence of additives.

The at least one erodable member may be designed to have different structural characteristics and to assume a wide variety of shapes, sizes and forms adapted to meet the intended use. Generally, the erodable member may be designed as a substantially solid rigid body, as a substantially solid flexible body or as a hollow member. Also, the erodable member may be made of one material, whereby the erodable part thereof is homogeneous; or the erodable member may be constituted of a number of different erodable materials, e.g. arranged in layers thus yielding a multilayer erodable member. Where the erodable member is multilayered member, the erodable member may be comprised of materials having different erosion rates thereby providing a member that gradually erodes layer by layer, optionally leaving the core intact and hard. Where the erodable member is a hollow member, the member may be empty or filled with any substance and through the erosion of the erodable member a passageway or a plurality of passageways can be formed thereby giving rise to leaching the material entrapped inside the erodable member. Such erodable member of a hollow type may be formed using film forming polymers, such as the film forming polymers used in the preparation of controlled release pharmaceutical formulations. The polymer film comprising the walls of the hollow erodable member may be degradable polymer so that in contact with the media it gradually degrades until a point where it collapses upon application of minor pressure or a non-degradable polymer that contain a soluble additives that can leach-out to give rise to formation of holes in the film that cause the collapse of the erodable member.

The at least one erodable member may be designed to have different rates of erosion to meet the intended use. The control of the rate of erosion may be achieved through the use of different compositions, e.g. PEG of different molecular weights and PEG copolymers with hydrophobic groups such as fatty acids, polylactic acid) or propylene glycol or hydrophilic groups such as sugar molecules and amino acids; through varying the size of the erodable member, through control of the surface area of the erodable member (by designing it to assume irregular shapes, by having a plurality of small erodable members instead of a relatively large one, etc.), through control of the size or structure of the ports that allow contact between the fluid and the erodable members, etc.

The erodable member may have a wide variety of different composition and design, beyond that described herein, depending on the type of the filtered fluid, the intended rate of degradation or erosion of the erodable member, and a variety of other factors as will be clear to the artisan.

The erosion rate of the erodable member, particularly in the potable water embodiment, can be further controlled by coating with an erodable or durable material. The coating can control the liquid penetration into a core of said member and thereby the rate of dissolution and/or also the subsequent diffusion of the dissolved material to the surrounding medium. Thus, through tailoring of such a coating, the overall rate in which the erodable member becomes eroded may be controlled. Typical durable coatings, particularly where the liquid is an aqueous liquid, are: poly(ethylene-vinyl acetate), polyurethanes, ethyl cellulose, poly(methacrylic acid-methyl methacrylate) and other biocompatible polymers that may be applied onto the bead or rod by dipping in an organic solution of the polymers, by spraying or any other suitable coating technique. The porosity or diffusion properties of the coating may be affected by adding a channeling agent to the polymer solution. Where the liquid is aqueous, the channeling agent is typically a water soluble component that either dissolves or disperse in the aqueous solution: when the coated beads with different channeling agents are placed in water, the channeling agent dissolves and leaches out to form channels within the film which allows diffusion of water into the bead. Typical channeling agents include: poly(ethylene glycol), poly(propylene glycol) and copolymers with ethylene glycol, which may be of different molecular weights; sugar beads of defined particle size, i.e. 100-500 microns, sodium chloride and other water soluble salts in bead form. The coating may also be a biodegradable coating including, for example, solid triglycerides and waxes, biodegradable polymers such as: polylactide (PLA), polycaprolactone (PCL), poly(anhydrides) and their copolymers.

The at least one erodable member may at times have a rate of erosion which depends on the nature of elements in the fluid. For example, in the case of water, the erodable member may erode at a rate which is function of various interactions with certain elements dissolved in the water, such as heavy metals, nauseous substance such as pesticides, etc. It is clear, that in case of filtration for the purpose of obtaining potable water, the main purpose of the filter is to filter out heavy metals, bacterial toxins, etc, and the usefulness of the filter will depend on the concentration of such elements in the source water. Thus, an indicator having at least one erodable member with an erosion rate which depends on the extent of such elements in the water, may at times be useful for indication of the quality of the filter to filter out such elements.

In accordance with a preferred embodiment of the invention, the indicator comprises an indicator member that is displaceable between two states, and is biased for displacement but is inhibited from doing so through the mechanical interference by at least one erodable member. Through erosion, the indicator member is gradually displaced and such displacement then serves as an indicator of the extent of use of the filter. The biasing force may be gravitation or may be a spring, a gas piston, a silicon band, a rubber band, and a variety of other devices, per se.

The indicator member in accordance with a preferred embodiment of the invention is displaced between two states within a confined track. Such track may be linear or curved, vertical or horizontal.

In accordance with another embodiment of the invention the indicator comprises an indicator member that has an arm pivoted about an axis and angularly displaceable between the two states, and is biased for displacement but is inhibited from doing so through the mechanical interference by at least one erodable member.

The at least one erodable member in accordance with the invention may further contain substances of supplementary and beneficial value. For example, in the case of water, the erodable member may further contain substances of nutritional or health value, such as minerals, vitamins, medicines, etc. and through erosion of the erodable member the substances are gradually released into the water, thus improving the nutritional or health value of the drinking water filtered through the filter.

The invention will now be further illustrated by the following description of some exemplary, non-limiting, specific embodiments that are depicted in the annexed drawings.

Figure 1B:
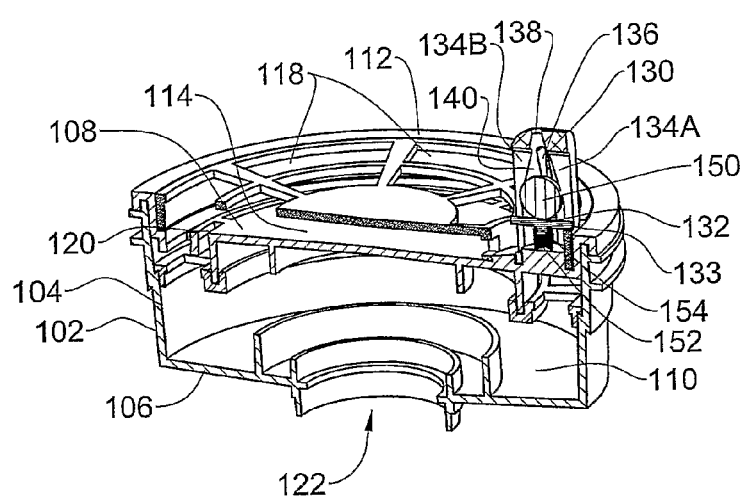
FIGS. 1B and 1C are perspective cross-sectional views through lines I-I in FIG. 1A with the indicator is in an initial state and in a state after extensive use of the filter, respectively.
Figure 1C:
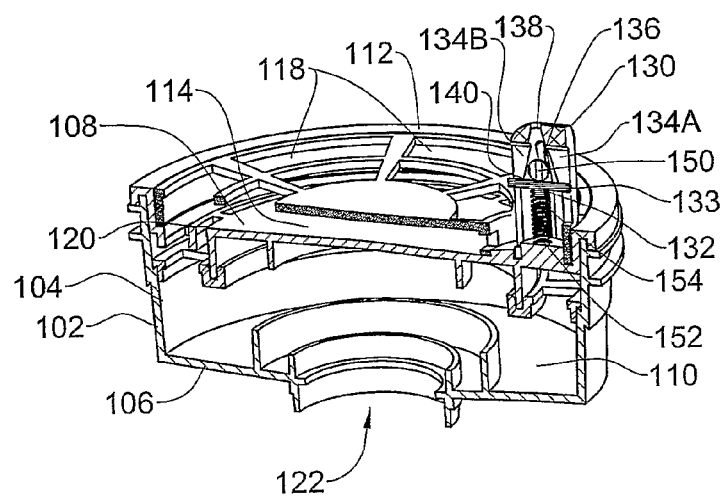

FIGS. 1A-1C show a water filtering device 100 useful for filtering source water into drinking water. Filter device 100 is particularly useful for a batch filtration procedure in which a reservoir is filled with source water and the water is then filtered into drinking water reservoir. Filter device 100 has a casing 102 with side walls 104, bottom walls 106 and upper walls 108 defining between them a primary filtering space 110. Filter 100 is also provided with a top cover 112 that defines jointly with said upper wall 108, an auxiliary filtering space 114. Typically, primary filtering space 110 will accommodate a water filtration media designed to absorb undesired substances from the water, such as pesticides, heavy metals, malodorous substances and other noxious substances or substances imparting an unpleasant quality to the water, while auxiliary filtering space 114 may accommodate a filtering matrix or the like, e.g. for filtering out particulate matter. Defined in cover 112 are a plurality of openings 118 permitting water entry from a water reservoir above the filter into the auxiliary filtering space 114 and from there through peripheral openings 120 into the primary filtering space 110. The water exits filter device 100 through a central opening 122 defined in bottom space 106.

Extending out of opening 128 in cover 112 is an indicator device 130 which is anchored in the upper face 108. Indicator device 130 has an indicator member 132 with arms 133 protruding sideways and accommodated within vertical openings 134A and 134B permitting movement of indicator member 132 in a vertical track between an initial state seen in FIG. 1B and an end state in which indicator 132 is fully upwardly displaced within the vertical path defined by openings 134A and 134B. Indicator device 130 has also two additional vertical openings 136, in between opening 134A and 134B, as well as a top opening 138.

Defined within the indicator device 130 is an internal space 140 having a general frusto-conical shape and accommodating an erodable member 150.

Indicator device 130 also includes a biasing spring 152 with its lower end being anchored in upper face 108 and its upper end being fitted around a downward projection 154 of indicator member 132. Through the biasing force of spring 152, which may be made of a variety of polymeric or non polymeric materials, indicator member 132 is biased to displacement from its initial state as seen in FIG. 1B to an end state as noted above.

In the initial state the vertical upward displacement of indicator member 132 is limited by erodable member 150. During use, water enters through openings 134A, 134B, 136 or 138, gradually eroding erodable member 150, whereby its size gradually decreases and consequently the indicator member 132 is displaced upwards. As can be seen in FIG. 1C, the erodable member is almost completely eroded with the indicator member being displaced proximal to its end position. When in such a state, this serves as an indication that the filter is close to or at the end of its useful life and should be replaced.

The ends 133 of the indicator member 132 can be viewed from the outside and their position thus serves as an indicator or the filter status.

Figure 2A:
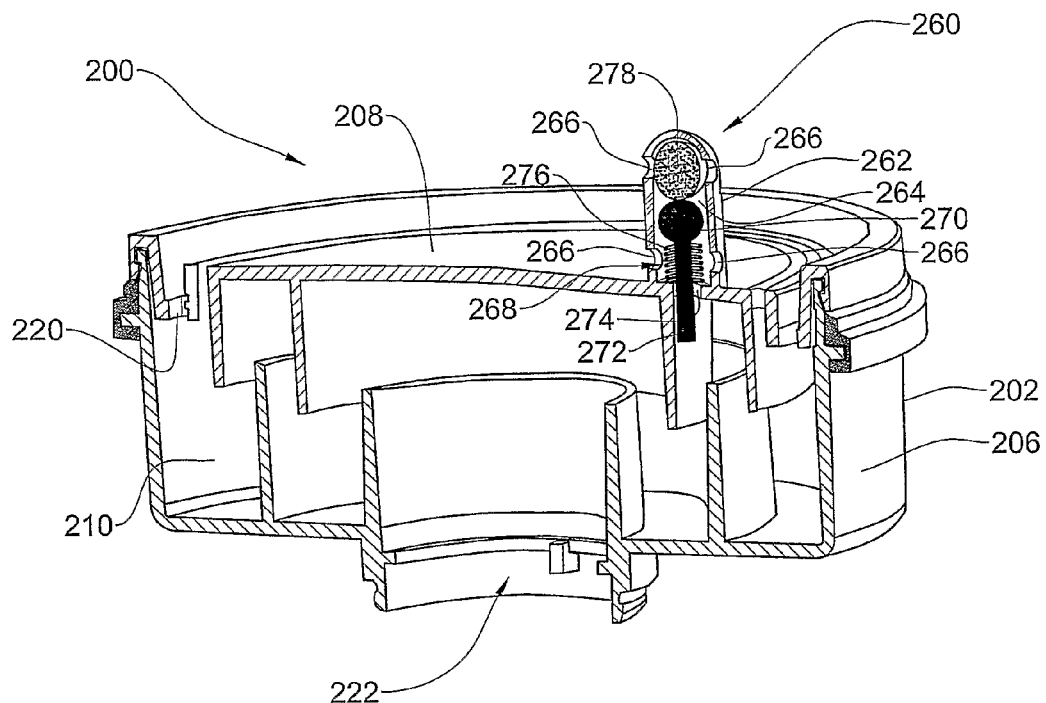
FIG. 2A and FIG. 2B are perspective cross-sectional views of a filter device incorporating an indicator according to another embodiment of the invention in respective initial state and in a state after extensive use of the filter, respectively.
Figure 2B:
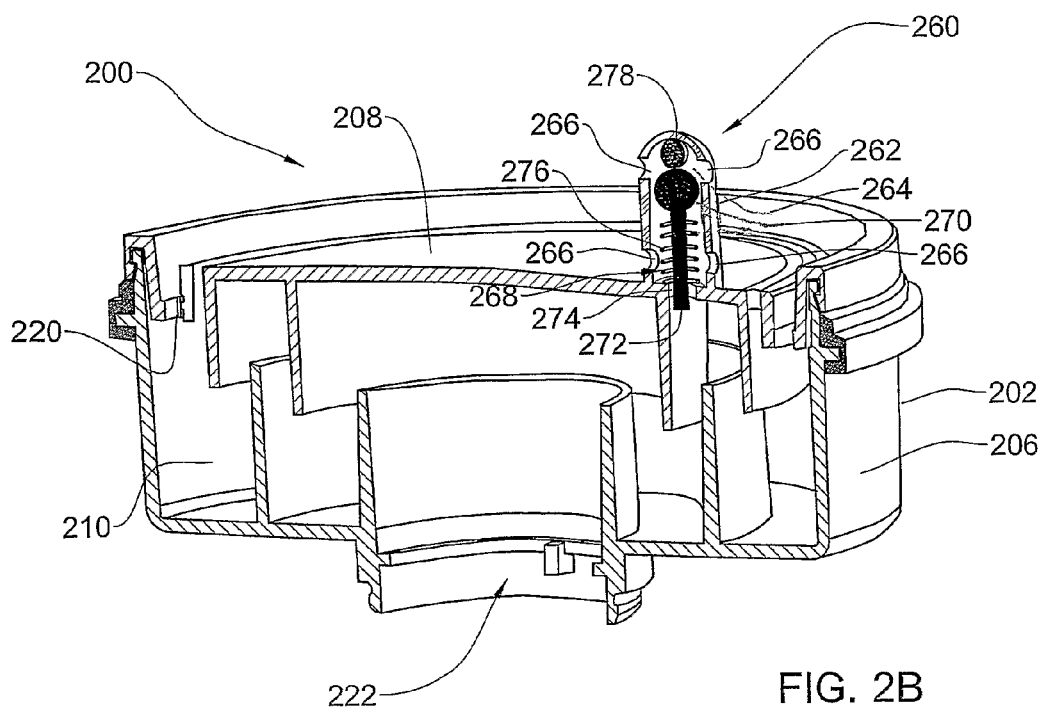

Reference is now being made to FIGS. 2A and 2B showing a filter device 200 according to another embodiment of the invention. In FIG. 2A like elements to those of the embodiment of FIG. 1A were given like reference numerals, shifted by one hundred and the reader is referred to the description of FIGS. 1A-1C for explanation of their nature and function. Filter device 200 differs from filter device 100 in that it does not comprise a cover such as cover 112.

Filter device 200 includes an indicator device 260 that has a casing 262 made of a transparent or a translucent material and defines an enclosed vertically oriented lumen 264, with a plurality of lateral openings 266. Indicator device 260 includes an indicator member 268 that has a head 270 and a stein 272 with its bottom end extending downward through openings 274 defined in upper face 208. Indicator member 268 is biased for upper displacement by spring 276. Included in the upper part of lumen 264 is an erodable member 278 which limits the upward displacement of indicator member 268. Upon use, water enters through openings 266 gradually eroding member 278 and permitting upward displacement of indicator member 268 to a state as shown in FIG. 2B indicating that the filter is at or close to the end of its useful life. The transparency or translucency of casing 262 permits visualization of the position of head 270.

Figure 3A:
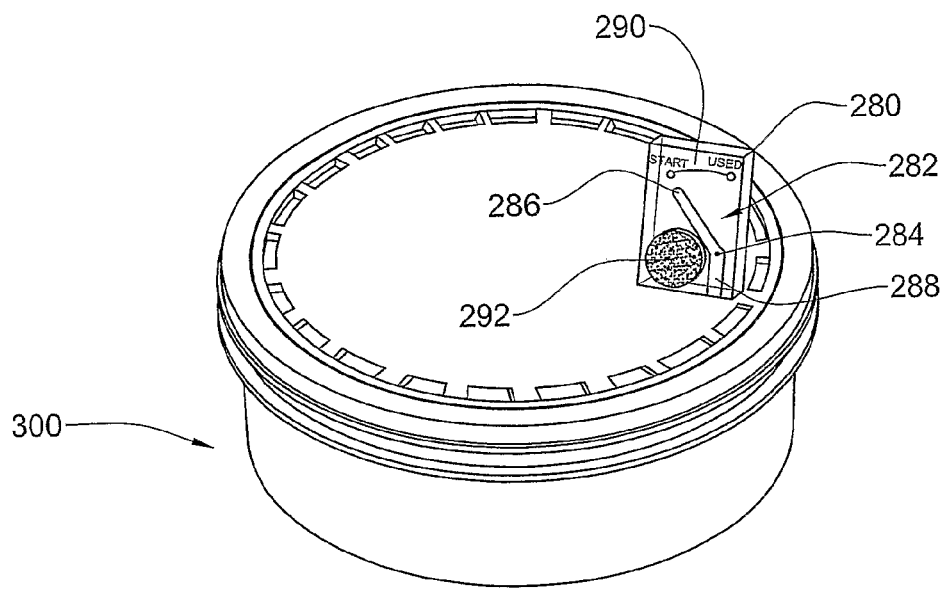
FIG. 3A and FIG. 3B are two different perspective views of a filter device incorporating an indicator according to another embodiment of the invention.
Figure 3B:
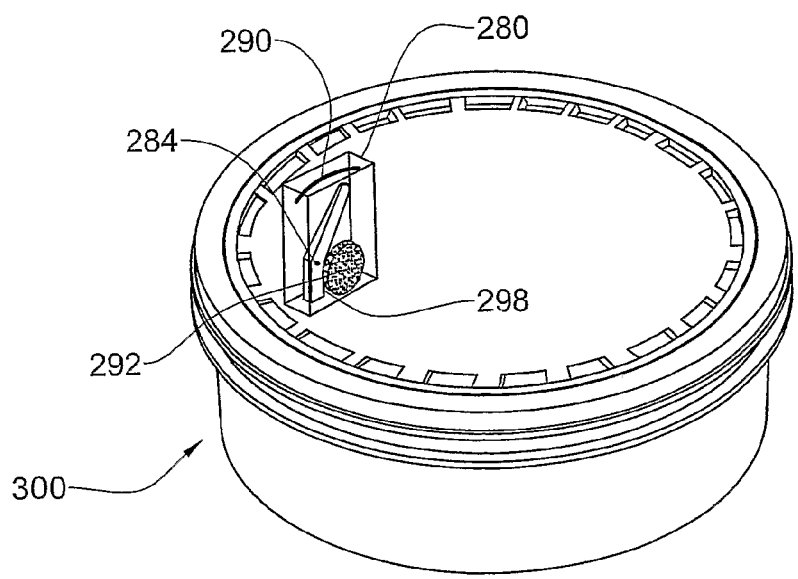
Figure 3C:
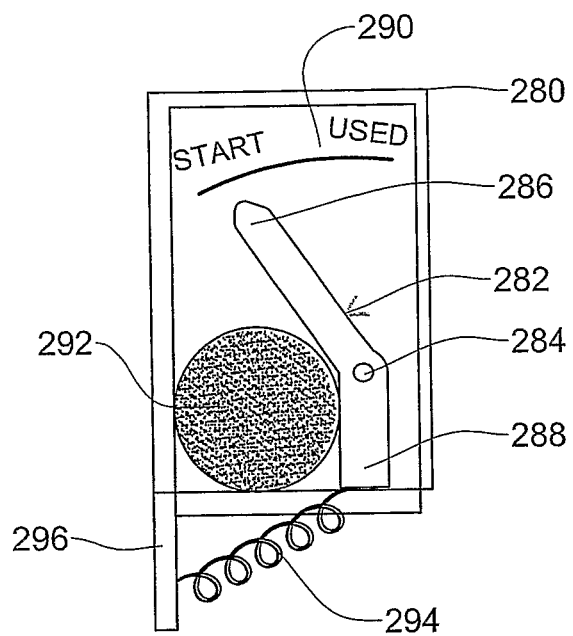
FIG. 3C and FIG. 3D show enlarged views of the indicator, revealing also the biasing spring, in an initial state and in a state after extensive use of the filter, respectively.
Figure 3D:
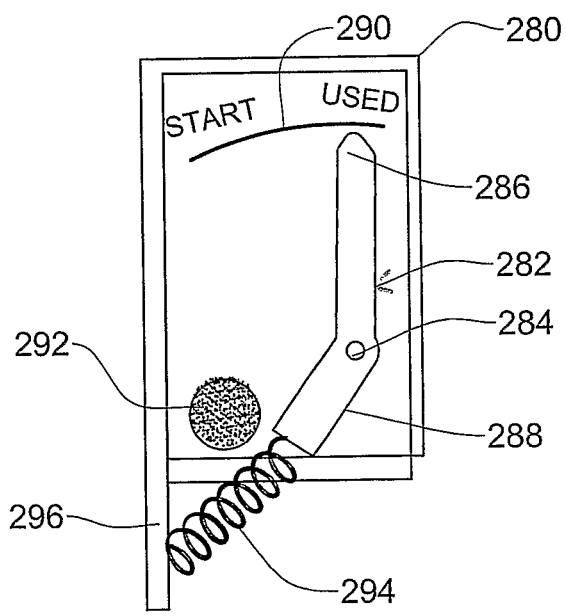

FIGS. 3A and 3B depicts a filter device 300 incorporating an indicator device 280 according to another embodiment of the invention. Enlarged schematic views of the indicator device 280 are seen in FIGS. 3C and 3D. The indicator device 280 is transparent or translucent and accommodates an indicator member 282 being pivotally fixed within device 280 through a pivot 284 extending between opposite walls of the device. Pivot 284 is situated between the indicators device's two arms—an upper arm 286 and a lower arm 288, angled one with respect to one another. Inscribed in one of the faces of the device, at it upper end, is a scale 290 extending between "START" and "USED". Accommodated within device 280 is an erodable member 292 which in the initial state seen in FIGS. 3A-3C, blocks the pivotal displacement of the indicator member 282.

As can be seen in FIGS. 3C and 3D, the bottom arm is connected by a spring 294 to an opposite wall segment 296 and urged thereby to be pivotally displaced, clockwise in the view of FIGS. 3C and 3D. This pivotal displacement is blocked by the erodable member 292. The indicator device 280 has an opening 298 at its bottom through which it is in fluid communication with the filter device's interior. When in use, water enters into the interior of indicator device 280 through opening 298 gradually eroding the erodable member, which erosion permits the pivotal displacement of the indicator member from the initial state seen in FIG. 3C, where the upper arm 286 points to "START", to the end state where the upper arm, 286 points to "USED", indicating that the filter is close to or at the end of its useful life.

Indicator device 280 is sealed but for opening 298 which opens into the interior filter space. Thus, indicator device 280 is suitable for both batch filtration procedures as well as online filtration procedures in which water is filtered continuously as it is consumed.

FIG. 4A depicts a water filtration system 400 similar to such systems in domestic use for filtering source water so as to obtain potable water. System 400 incorporates an indicator device 460 of a kind similar to indicator device 260 of the embodiment depicted in FIGS. 2A and 2B. Like elements to those of FIGS. 2A and 2B were given like reference numerals shifted by two hundred and the reader is referred to the description of FIGS. 2A and 2B for an explanation of their nature and function. Provided on the left of the indicator device 460 are markings including "START" and "USED". In the initial state, seen in FIG. 4B the erodable member 478 is relatively large and thus the head 470 of the indicator member 468 is opposite or relatively close to the "START" marking. Following use, the erodable member 478 gradually erodes permitting upwards displacement of the indicator member 468 to a position in which the head is close to or opposite the "USED" marking indicating that the filter needs replacement, as depicted schematically in FIG. 4C. It should be noted, that jointly with the filter there is also a need to replace the indicator device.

In some embodiments, the indicator device and the filter in a water filtration system, such as system 400 are independent devices; in other embodiments the indicator device and the filter are combined in a similar manner as that described above. It should also be noted that a filter system may also be made with a different indicator device in accordance with the present invention, e.g. an indicator device such as that depicted in FIGS. 3A-3D.

Figure 5A:
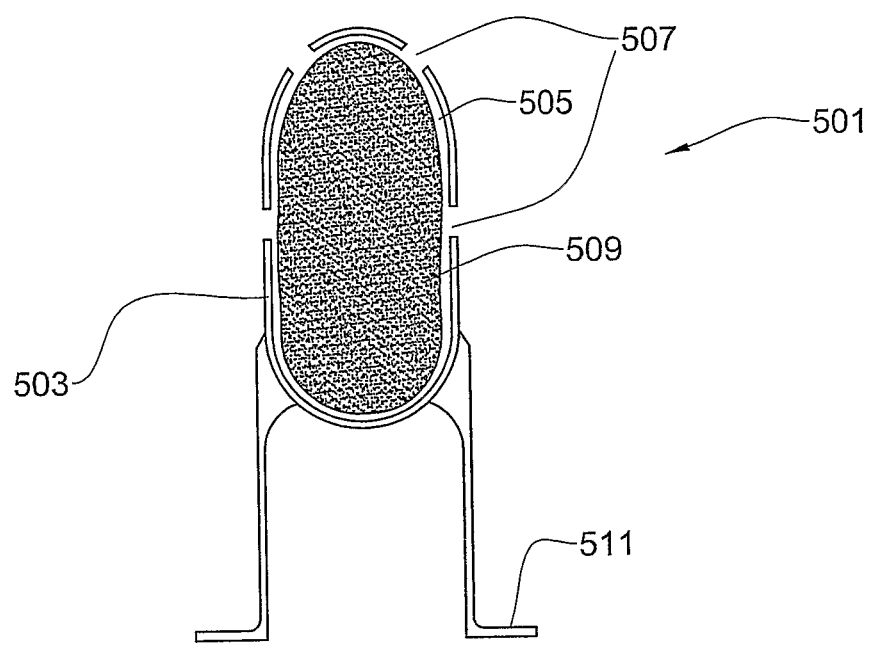
FIG. 5A and FIG. 5B show schematic views of an indicator according to an embodiment of the invention in an initial state and in a state after extensive use of the filter, respectively.
Figure 5B:
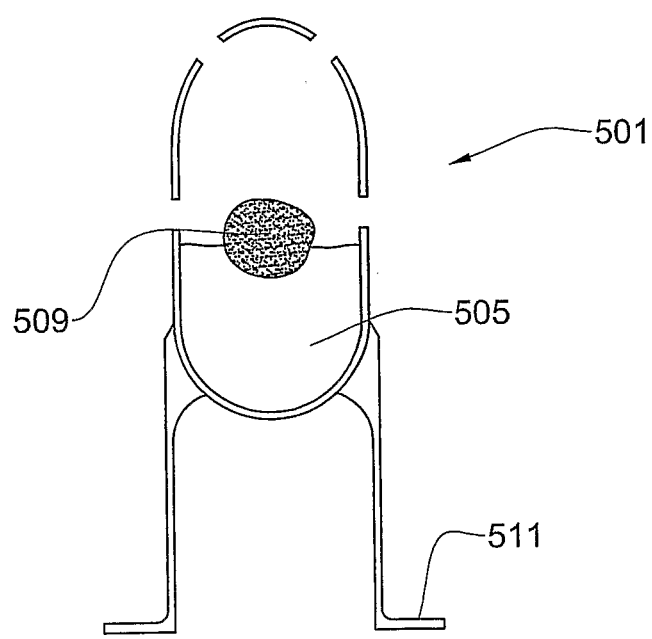

FIGS. 5A and 5B depict a schematic illustration of an indicator device 501 having a transparent or translucent envelope 503 defining a confined space 505 with a plurality of openings 507 providing a fluid link between space 505 and the surrounding. Accommodated within confined space 505 is and erodable member 509. Device 501 is typically designed so that it protrudes into a source water reservoir which is then filtered through a filter to obtain drinking quality water and is thus particularly suitable for batch filtration procedures. For example, device 501 may be fixed or anchored through its bottom 511 to an upper face of a filter; or the bottom 511 of device 501 may be made to be integral with the filter's upper face.

When the reservoir is filled with water, water also enters the confined space 505 and thus the erodable member 509 is gradually eroded. FIG. 5B depicts the erodable member as being almost fully eroded and floating in a small remaining source water pool. In this embodiment, the erodable member itself serves as the indicator without employing a separate indicator member as described above.

Figure 6A:
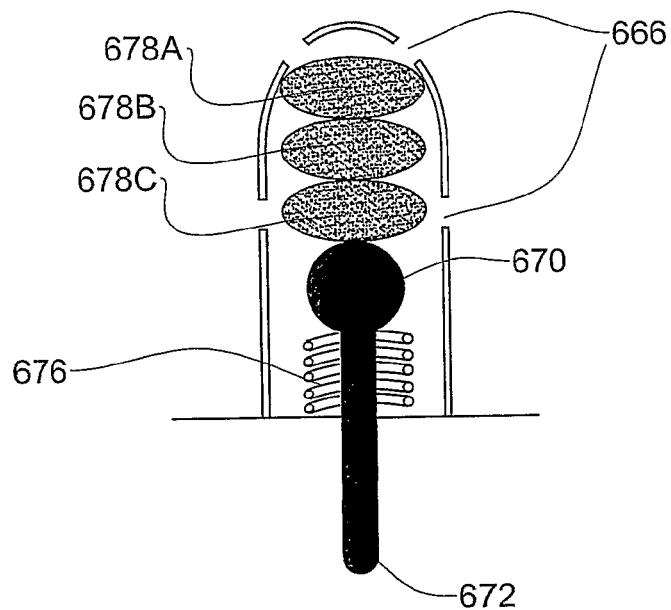
FIG. 6A and FIG. 6B show schematic views of an indicator according to another embodiment of the invention in an initial state and in a state after extensive use of the filter, respectively.
Figure 6B:
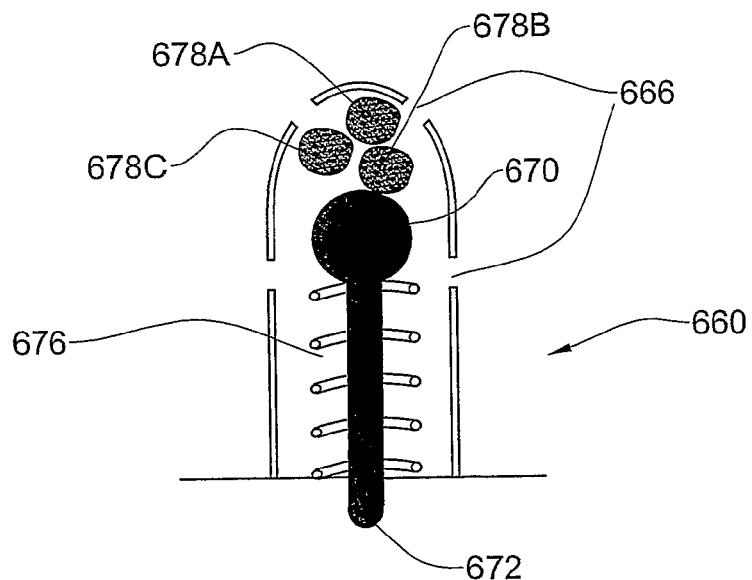

FIGS. 6A and 6B depict an indicator device 660 that has similarities to that of FIGS. 2A and 2B and thus like elements have been given like reference numerals shifted by four hundred. The reader is referred in particular to the description of FIG. 2A for an explanation on the nature and function of such elements. The difference between indicator device 660 and indicator device 260 of FIGS. 2A and 2B is in that the former includes a plurality of erodable members, three in this embodiment—678A, 678B and 678C. Otherwise the function is similar to that of the erodable member 278.

What is claimed is:
1. A liquid filter for filtering a source liquid, comprising:
an indicator device comprising:
(i) at least one erodable member positioned in the liquid filter to be in contact with a source liquid;
(ii) an indicator member; and
(iii) a visual indication arrangement;
wherein said erodable member is configured to:
(a) be gradually eroded by interaction with the source liquid or with an element within the source liquid and
(b) have an erosion profile that correlates to an extent of use of the liquid filter,
wherein the indicator member is configured to:

(a) be gradually displaced by a change in size of said erodable member and
(b) allow the source liquid to flow through the liquid filter when the indicator member is displaced to an end state,
wherein the end state is when the erodible member is completely eroded; and
wherein the visual indication arrangement is configured:
(a) for directly viewing said change in size of the erodable member or
(b) for directly viewing a gradual displacement of the indicator member.

2. A filter according to claim 1, wherein the liquid is water and the erodable member releases during its erosion, a substance of nutritional or health value into the water.

3. A filter according to claim 1, wherein the at least one erodable member is contained within a housing having one or more ports to permit contact between the liquid and the erodable member.

4. A liquid filter for filtering a source liquid, comprising: an indicator device comprising:
(i) an indicator member arranged for direct viewing thereof by a user and
(ii) at least one erodable member;
wherein the indicator member is configured to:
(a) be visibly and gradually displaceable from an initial state to an end state
(b) be biased for displacement to the end state, and
(c) allow the source liquid to flow through the liquid filter when the indicator member is displaced to the end state,
wherein the end state is when the erodible member is completely eroded;
wherein the at least one erodable member is configured to:
(a) be visibly and gradually erodable through interaction with the source liquid or with an element within the liquid
(b) have an erosion profile correlating with the extent of use of the filter, and
(c) block the biased displacement of the indicator member;
wherein erosion of the at least one erodable member causes gradual displacement of the indicator member from the initial state towards the end state; and
wherein said displacement is visible to a user.

5. A filter according to claim 4, wherein the displacement bias is gravitational.

6. A filter according to claim 4, comprising an urging device for biasing displacement of the indicator member from the initial towards the end state.

7. A filter according to claim 4, wherein the displacement of the indicator member from the initial to the end state includes movement thereof within a track.

8. A filter according to claim 4, wherein the indicator member has an arm pivoted about an axis and angularly displaceable between the two states.

9. A filter according to claim 4, wherein the indicator member and the at least one erodable member are contained within a housing having one or more ports to permit contact between the liquid and the at least one erodable member.

10. An indicator device for use in combination with a liquid filtration system for filtering source liquid, the device comprising:
(i) at least one erodable member in contact with the source liquid,
wherein said at least one erodable member is configured to:
(a) be gradually eroded by interaction with the source liquid or with an element within the liquid and
(b) have an erosion profile that correlates to an extent of use of the liquid filter, and
(ii) a visual indication arrangement configured for directly viewing said change in size of the erodable member and
(iii) a gradually displaceable indicator member configured to:
(a) be gradually displaced by the change in size of said erodable member, and
(b) allow the source liquid to flow through the liquid filter when the indicator member is displaced to an end state;
wherein the end state is when the erodible member is completely eroded.

11. An indicator device for use in combination with a source liquid filtration system, comprising:
(i) an indicator member arranged for direct viewing thereof by a user and
(ii) at least one erodable member;
wherein the indicator member is configured to
(a) be visibly and gradually displaceable from an initial state to an end state,
(b) allow the source liquid to flow through the liquid filter when the indicator member is displaced to an end state, and
(c) be biased for displacement to the end state,
wherein the end state is when the erodible member is completely eroded;
wherein the at least one erodable member is configured to:
(a) be visibly and gradually erodable through interaction with the source liquid or with an element within the liquid,
(b) have an erosion profile correlating with an extent of use of the filter, and
(c) block the biased displacement of the indicator member;
wherein erosion of the at least one erodable member causes gradual displacement of the indicator member from the initial state towards the end state, and
wherein said displacement is visible to a user.

12. A liquid filtration system for filtering a source liquid, comprising:
(i) a liquid filter configured for filtering the source liquid; and
(ii) an indicator device for the status of the filter that comprises:
(a) an indicator member arranged for direct viewing thereof by a user and
(b) at least one erodable member,
wherein the indicator member is configured to:
(1) be visibly and gradually displaceable from an initial state to an end state and
(2) be biased for displacement to the end state,
(3) allow the source liquid to flow through the liquid filter when the indicator member is displaced to the end state,
wherein the end state is when the erodible member is completely eroded;
wherein the at least one erodable member is configured to:
(1) be visibly and gradually erodable through interaction with the source liquid or with an element within the liquid
(2) have an erosion profile correlating with the extent of use of the filter, and (3) block the biased displacement of the indicator member;
wherein erosion of the at least one erodable member causes gradual displacement of the indicator member from the initial state towards the end state, and
wherein said displacement is visible to the user.

13. A method for monitoring extent of use of a filter comprising:
providing an indicator device comprising:
(i) an indicator member arranged for direct viewing thereof by a user and
(ii) at least one erodable member;
wherein the indicator member is configured to:
(a) be visibly and gradually displaceable from an initial state to an end state,
(b) allow a source liquid to flow through the filter when the indicator member is displaced to the end state, and
(c) be biased for displacement to the end state,
wherein the end state is when the erodible member is completely eroded;
wherein the at least one erodable member is configured to:
(a) be visibly and gradually erodable through interaction with liquid or with an element within the liquid
(b) have an erosion profile correlating with the extent of use of the filter, and
(c) block the biased displacement of the indicator member;
wherein erosion of the at least one erodable member causes gradual displacement of the indicator member from the initial stat towards the end state; and
monitoring a state of the indicator member,
wherein said gradual displacement of the indicator member is visible to the user.

14. A filter assembly comprising:
a liquid filter for filtering a source liquid;
a housing sized to receive said liquid filter, said housing having an opening at one of its walls;
an indicator device for the status of the filter that comprises at least one erodible member in contact with the source liquid, said indicator device being an integral part of the filter and extends out of the opening in the housing; and
a visual indication arrangement configured for directly viewing a change in size of said erodable member or for directly viewing a gradual displacement of a gradually displaceable indicator member associated with said erodable member,
wherein said indicator member is configured to:
(a) be gradually displaced by said change in size of said erodable member, and
(b) allow the source liquid to flow through the liquid filter when the indicator member is displaced to an end state,
wherein the end state is when the erodible member is completely eroded; and
wherein said erodable member is configured to:
(a) be gradually eroded by interaction with the liquid or with an element within the liquid and
(b) have an erosion profile that correlates to an extent of use of the liquid filter.

15. A filter assembly according to claim 14, wherein the liquid is water and the erodable member releases during its erosion, a substance of nutritional or health value into the water.

16. A filter according assembly to claim 14, wherein the at least one erodable member is contained within a filter housing having one or more ports to permit contact between the liquid and the erodable member.

* * * * *